US010099638B2

(12) United States Patent
Nusier et al.

(10) Patent No.: US 10,099,638 B2
(45) Date of Patent: Oct. 16, 2018

(54) BUMPER ASSEMBLY (71) Applicant: Ford Global Technologies, LLC, Dearborn, MI (US)

(72) Inventors: Saied Nusier, Canton, MI (US); Mohamed Ridha Baccouche, Ann Arbor, MI (US); Jamel E. Belwafa, Ann Arbor, MI (US); Saeed David Barbat, Novi, MI (US); Rahul Arora, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 15/442,741

(22) Filed: Feb. 27, 2017

(65) Prior Publication Data
US 2018/0244222 A1    Aug. 30, 2018

(51) Int. Cl.
*B60R 19/18*    (2006.01)
*B60R 19/34*    (2006.01)

(52) U.S. Cl.
CPC .............. *B60R 19/18* (2013.01); *B60R 19/34* (2013.01); *B60R 2019/1893* (2013.01)

(58) Field of Classification Search
CPC ................................ B60R 19/18; B60R 19/34
USPC .................................................. 293/102, 120
See application file for complete search history.

(56) References Cited

U.S. PATENT DOCUMENTS

| 3,806,180 | A | * | 4/1974 | Patterson | ................. B60R 19/18 188/371 |
| 3,938,841 | A | | 2/1976 | Glance et al. | |
| 4,221,413 | A | | 9/1980 | Bonnetain | |
| 5,031,947 | A | * | 7/1991 | Chen | ....................... B60R 19/02 267/139 |
| 6,315,339 | B1 | | 11/2001 | Devilliers et al. | |
| 6,443,513 | B1 | | 9/2002 | Glance | |
| 7,163,242 | B2 | | 1/2007 | Shuler et al. | |
| 7,806,448 | B2 | | 10/2010 | Allen et al. | |
| 8,104,804 | B2 | * | 1/2012 | Mani | ....................... B60R 19/18 293/130 |
| 9,731,669 | B2 | | 8/2017 | Nagwanshi et al. | |
| 2003/0164618 | A1 | | 9/2003 | Gentle | |
| 2003/0189343 | A1 | | 10/2003 | Evans et al. | |
| 2005/0057053 | A1 | | 3/2005 | Evans et al. | |
| 2006/0022472 | A1 | * | 2/2006 | Omura | .................... B60R 19/18 293/120 |

(Continued)

FOREIGN PATENT DOCUMENTS

DE         2850723 A1    5/1979
DE    102005037152 A1    2/2007

(Continued)

OTHER PUBLICATIONS

Non-Final Office Action dated Oct. 6, 2017 in U.S. Appl. No. 15/169,428 (35 pages).

*Primary Examiner* — Joseph D. Pape
(74) *Attorney, Agent, or Firm* — Jason C. Rogers; Bejin Bieneman PLC (57) ABSTRACT A bumper assembly includes a beam and a plurality of members attached to and positioned sequentially along the beam. Each member includes an outer tube extending transverse to the beam and an inner tube extending parallel to and in the outer tube. Adjacent ones of the members are configured to contact each other when both adjacent ones of the members are deformed.

19 Claims, 5 Drawing Sheets (56) References Cited

U.S. PATENT DOCUMENTS

| | | |
|---|---|---|
| 2006/0028038 A1 | 2/2006 | Glasgow et al. |
| 2006/0131901 A1 | 6/2006 | Nguyen et al. |
| 2007/0267261 A1 | 11/2007 | Toccalino et al. |
| 2007/0278803 A1 | 12/2007 | Jaarda et al. |
| 2008/0256686 A1 | 10/2008 | Ferrara |
| 2009/0026801 A1 | 1/2009 | Murayama et al. |
| 2009/0045637 A1 | 2/2009 | Kusche et al. |
| 2011/0006554 A1 | 1/2011 | Mani |
| 2011/0109105 A1 | 5/2011 | Ralston et al. |
| 2011/0309653 A1 | 12/2011 | Schuler et al. |
| 2012/0104775 A1 | 5/2012 | Marur et al. |
| 2012/0146347 A1 | 6/2012 | Huang et al. |
| 2012/0286529 A1 | 11/2012 | Gukkenberger et al. |
| 2013/0113226 A1 | 5/2013 | Bobba et al. |
| 2013/0175128 A1 | 7/2013 | Kumar et al. |
| 2013/0221691 A1 | 8/2013 | Nagwanshi et al. |
| 2013/0313841 A1 | 11/2013 | Mana et al. |
| 2014/0312636 A1 | 10/2014 | Corwin et al. |
| 2017/0088074 A1 | 3/2017 | Borghi |

FOREIGN PATENT DOCUMENTS

| | | |
|---|---|---|
| JP | 2004237810 A | 8/2004 |
| WO | WO 2006081942 A1 | 8/2006 |

\* cited by examiner

BUMPER ASSEMBLY

BACKGROUND

Bumpers of vehicles are designed to absorb energy and/or transfer energy during vehicle impacts. Such vehicle impacts may include frontal and rear impacts. Impacts may occur with objects of varying size and mass. For example, a vehicle may impact a relatively large, wide object such as another vehicle or a road barrier. Such impacts may be simulated with crash tests, such as a frontal impact test, a frontal oblique impact test, small offset rigid barrier (SORB) test, etc. Alternatively, the vehicle may impact narrower, lighter objects, such as pedestrians. These impacts may be simulated by pedestrian protection (PedPro) crash tests. Regardless of the size of the object being impacted, another consideration in the design of the bumper is low-speed damageability, which is simulated by crash tests that measure the amount of damage to the exterior of the bumper resulting from low-speed impacts. In these tests, little or no exterior damage to the bumper is desired to reduce the likelihood of costly repairs resulting from low-speed impacts.

These different classes of impacts present competing design factors for the bumper. During an impact with a larger, wider object, it may be more beneficial for the bumper to provide greater stiffness during deformation of the bumper to increase the energy absorbed. In contrast, during an impact with a narrower object that may be a pedestrian, it may be more beneficial to reduce the stiffness of the bumper during deformation, which may reduce injuries to the pedestrian. In further contrast, it may be beneficial for the bumper to be rigid, with no deformation, during low-speed damageability tests to reduce the likelihood of damage to the exterior of the bumper.

DETAILED DESCRIPTION

With reference to the Figures, wherein like numerals indicate like parts throughout the several views, a bumper assembly 32 of a vehicle 30 includes a beam 34 and a plurality of members 36 attached to and positioned sequentially along the beam 34. Each member 36 includes an outer tube 40 extending transverse to the beam 34 and an inner tube 42 extending parallel to and in the outer tube 40. Adjacent ones of the members 36 are configured to contact each other when both adjacent ones of the members 36 are deformed.

Each outer tube 40 may have an inner surface 66, and each inner tube 42 is attached to the inner surface 66 at a connection line 68. Additionally, each member 36 may include a bridge portion 70 extending from the inner surface 66 of the outer tube 40 to the inner tube 42. Further, each bridge portion 70 may be attached to the inner tube 42 opposite from the connection line 68.

The outer and inner tubes 40, 42 may be round. Additionally, the inner tubes 42 may be elliptical.

The outer and inner tubes 40, 42 may have wall thicknesses. The wall thickness of each outer tube 40 may be thinner than the wall thickness of the corresponding inner tube 42.

The beam 34 may extend between two ends 60 and may have a midpoint 62 halfway between the ends 60. The outer tubes 40 may have corresponding diameters. At least some of the diameters are different than other of the diameters. The members 36 may be arranged in ascending order of the corresponding diameters of the outer tubes 40 from each end 60 to the midpoint 62.

The beam 34 may extend between the two ends 60 and may have the midpoint 62 halfway between the ends 60. The outer tubes 40 have corresponding wall thicknesses. The members 36 may be arranged in ascending order of the corresponding wall thicknesses of the outer tubes 40 from the midpoint 62 to each end 60.

The outer tubes 40 may be generally parallel to each other. Additionally, the members 36 and the beam 34 may be integral. Further additionally, the beam 34 and the members 36 may be extruded.

The members 36 may be spaced from each other.

The bumper assembly 32 may include a bumper beam 38 extending parallel to the beam 34. The beam 34 may be coupled to the bumper beam 38. Additionally, the bumper assembly 32 may include a fascia 54 extending parallel to the beam 34. The fascia 54 may be coupled to the bumper beam 38 and extend around the members 36. Alternatively or additionally, the beam 34 may have an upper edge 56 and a lower edge 58 extending in a direction of the beam 34. The bumper beam 38 may include a first groove 50 for accepting the lower edge 58 of the beam 34. Additionally, the bumper beam 38 may include a second groove 52 accepting the upper edge 56 of the beam 34. Alternatively or additionally, the beam 34 may be fastened at the upper edge 56 to the bumper beam 38.

The bumper assembly 32 can contribute to both pedestrian impact performance and to energy-absorption in the event of a frontal collision. During an impact with a narrow object such as a pedestrian, the bumper assembly 32 provides less resistance and a softer impact than with a wider object. The decreased resistance may reduce a likelihood of injury to pedestrians. During an impact with a wider object such as another vehicle, the bumper assembly 32 provides greater resistance and stiffness. The increased resistance and stiffness may increase how much energy is absorbed during the impact, possibly reducing a likelihood of injury to occupants of the vehicle 30.

Figure 1:
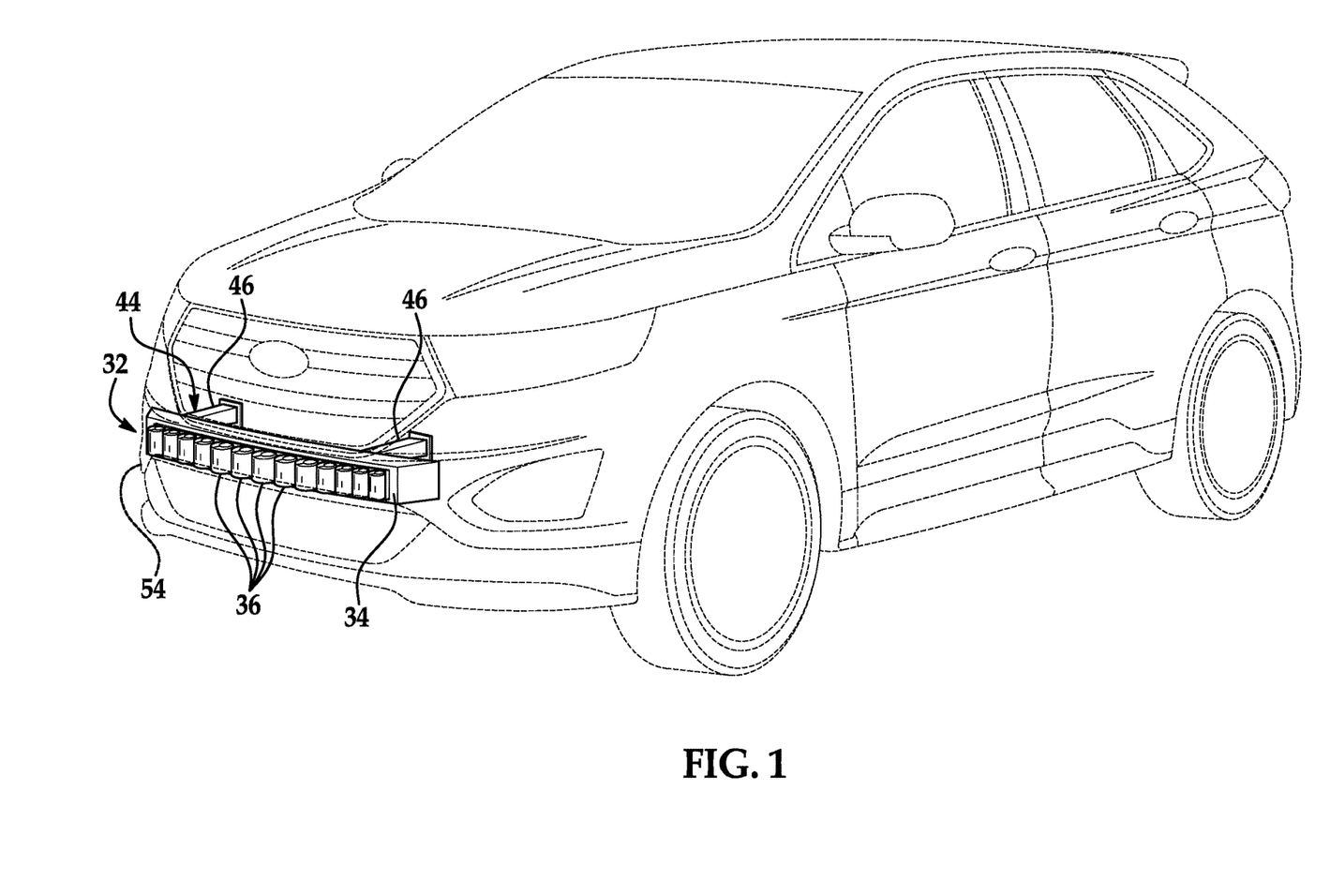
FIG. 1 is a perspective view of a vehicle.

With reference to FIG. 1, the vehicle 30 includes a frame 44, and the bumper assembly 32 is attached to the frame 44.

The bumper assembly 32 may be disposed toward a front of the vehicle 30, as shown in FIG. 1, or toward a rear of the vehicle 30. The bumper assembly 32 may protrude from the frame 44 such that the bumper assembly 32 is the first component of the vehicle 30 impacted in a front or rear collision.

The frame 44 may be of any suitable construction, e.g., unibody construction, body-on-frame construction, or of any other suitable construction. The frame 44 may be formed of any suitable material, for example, steel, aluminum, etc.

With reference to FIGS. 1-4, the frame 44 may include crush cans 46 supporting the bumper assembly 32 on the frame 44. The crush cans 46 may extend in a vehicle-forward direction from the rest of the frame 44 to a bumper beam 38 of the bumper assembly 32. The crush cans 46 may be fastened, welded, etc. to the rest of the frame 44.

The crush cans 46 may serve as energy absorbers, sometimes known as "crumple zones." The crush cans 46 may absorb some of the energy of a collision of the vehicle 30 through deformation, thus lessening the amount of energy transferred to the rest of the frame 44 and the vehicle 30.

Figure 2:
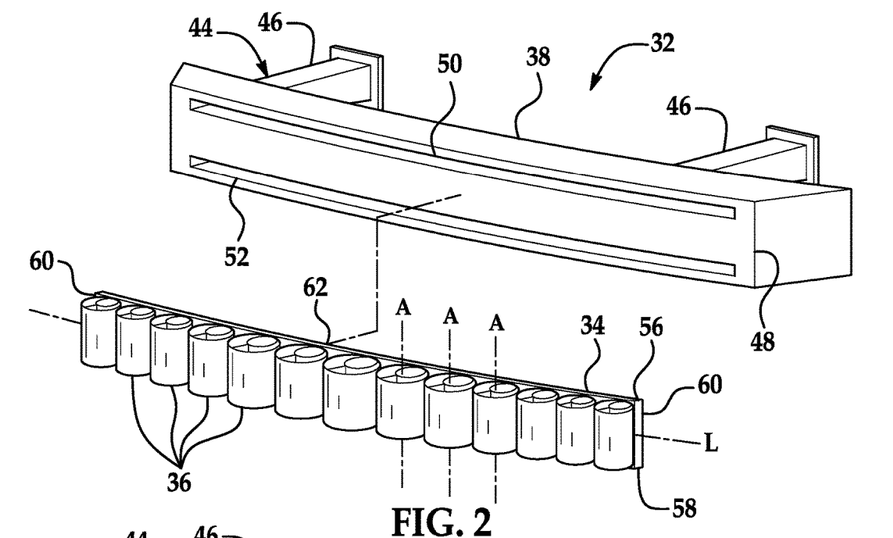
FIG. 2 is an exploded view of a bumper assembly of the vehicle.
Figure 3:
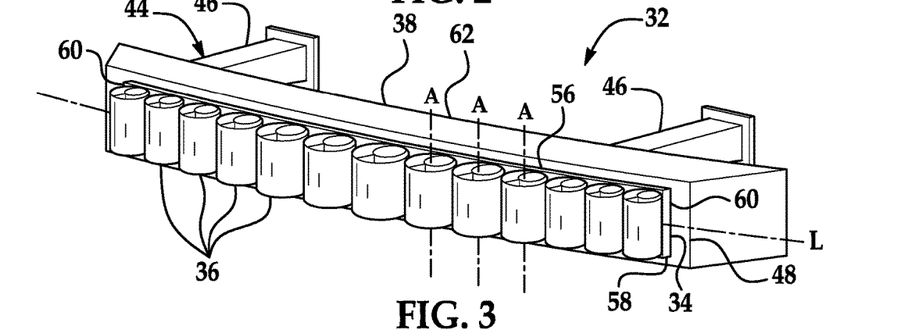
FIG. 3 is a perspective view of a bumper assembly of the vehicle.
Figure 4:
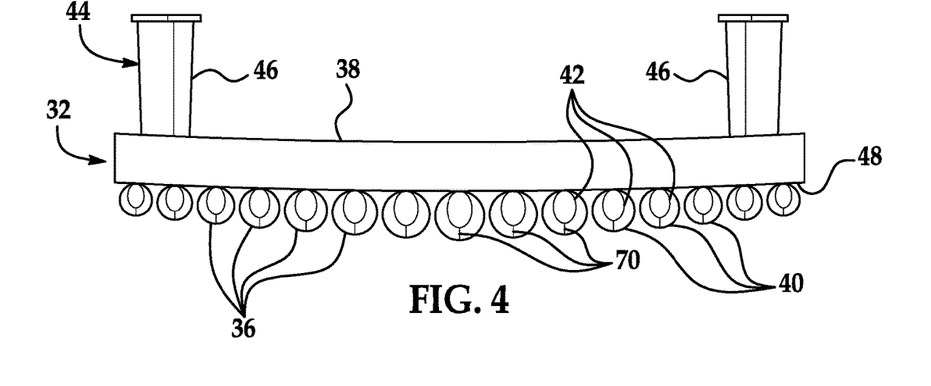
FIG. 4 is a top view of the bumper assembly.

With reference to FIGS. 2-4, the bumper assembly 32 may include the bumper beam 38 fixed to the frame 44, the beam 34 fixed to the bumper beam 38, and the members 36 attached to the beam 34.

The bumper beam 38 extends longitudinally across a front or rear of the vehicle 30, parallel to the beam 34. The bumper beam 38 may have a vehicle-outward face 48, which for a front bumper assembly 32 faces the direction of the vehicle 30 when traveling forward and for a rear bumper assembly 32 faces the direction of the vehicle 30 when traveling in reverse. The bumper beam 38 may reinforce the structural integrity of the vehicle 30. The bumper beam 38 may be formed of any suitable material, for example, steel, aluminum, etc.

With reference to FIGS. 2 and 3, the bumper beam 38 may include a first groove 50 and a second groove 52. (The adjectives "first" and "second" are used throughout this document as identifiers and are not intended to signify importance or order.) The grooves 50, 52 may extend in the direction of the beam 34. The grooves 50, 52 may be sized to accept the beam 34, for example, slotted to accept edges 56, 68 of the beam 34; curved to wrap around the edges 56, 58 of the beam 34; etc.

With reference to FIG. 1, a fascia 54 may extend parallel to the beam 34. The fascia 54 is coupled to the bumper beam 38, either directly or indirectly. The fascia 54 may extend around the members 36 and the rest of the bumper assembly 32, thereby concealing the bumper assembly 32. The fascia 54 may present a class-A surface, i.e., a surface specifically manufactured to have a high-quality, finished aesthetic appearance free of blemishes. The fascia 54 may be supported by the frame 44 and/or body components of the vehicle 30.

With reference to FIGS. 2-4, the beam 34 defines a longitudinal axis L. The longitudinal axis L may extend generally horizontally. The beam 34 may be formed of any suitable material, including plastic, such as injection-molded plastic; metal, such as aluminum or steel; or any other suitable material. The beam 34 has an upper edge 56 and a lower edge 58 extending in a direction of the beam 34, that is, generally parallel to the longitudinal axis L. The beam 34 extends between two ends 60. The beam 34 extends through a midpoint 62, that is, a point halfway between the two ends 60. The midpoint 62 may correspond to a central longitudinal axis of the vehicle 30 in a vehicle-forward direction. The beam 34 may be formed of any suitable material, including plastic, such as injection-molded plastic; metal, such as aluminum or steel; or any other suitable material.

With reference to FIGS. 2 and 3, the beam 34 may be attached to the vehicle-outward face 48 of the bumper beam 38. The beam 34 may be flush with the bumper beam 38, or the beam 34 may be spaced from the bumper beam 38. Alternatively, the beam 34 may be identical to the bumper beam 38. The beam 34 may be coupled to the bumper beam 38. For example, the first groove 50 may accept the lower edge 58 of the beam 34, and the second groove 52 may accept the upper edge 56 of the beam 34. Alternatively or additionally, the upper edge 56 may be fastened to the bumper beam 38.

Figure 5:
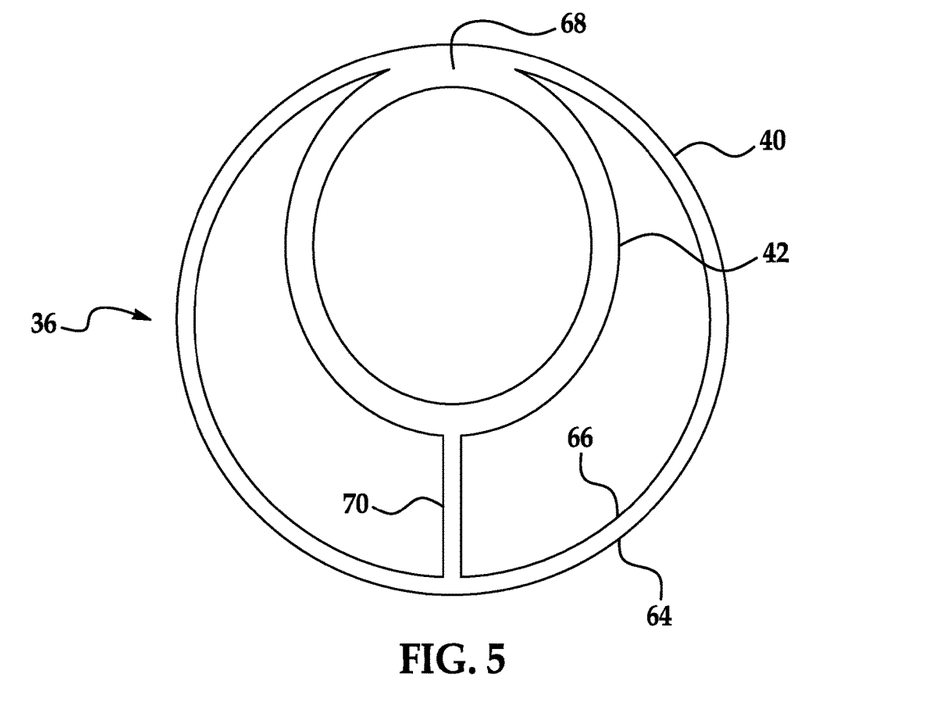
FIG. 5 is a top view of a member of the bumper assembly.

With reference to FIG. 5, each member 36 includes the outer tube 40 and the inner tube 42. The inner tube 42 extends parallel to and in the outer tube 40. The outer tube 40 includes an outer surface 64 facing radially outward and an inner surface 66 facing radially inward. The inner tube 42 may be attached to the inner surface 66 of the outer tube 40 at a connection line 68. The connection line 68 may extend longitudinally relative to the outer tube 40. Each member 36 may include a bridge portion 70 extending from the inner surface 66 of the tube to the inner tube 42. Each bridge portion 70 may be attached to the inner tube 42 opposite from the connection line 68.

Each outer tube 40 extends transverse to the beam 34. The outer tube 40 may be round. In other words, in cross-section, the outer tube 40 may be continuous along an arcuate path. For example, the outer tube 40 may have a circular cross-section. Each of the outer tubes 40 may define a member axis A extending in the direction of the outer tube 40. The member axes A may all be parallel to each other. Each member axis A may extend vertically, that is, in a vehicle-upward direction. Each of the outer tubes 40 may have a wall thickness and an outer diameter. At least some of the outer tubes 40 may have different outer diameters than other of the outer tubes 40. At least some of the outer tubes 40 may have different wall thicknesses than other of the outer tubes 40.

With continued reference to FIG. 5, each inner tube 42 extends transverse to the beam 34 and parallel to the corresponding outer tube 40. Each inner tube 42 may extend in the direction of the member axis A of the corresponding outer tube 40. The inner tube 42 may be round. In other words, in cross-section, the inner tube 42 may be continuous along an arcuate path. For example, the inner tube 42 may have an elliptical cross-section. Each of the inner tubes 42 has a wall thickness, and the wall thickness of the corresponding outer tube 40 may be thinner than the wall thickness of the inner tube 42.

With reference to FIG. 4, the members 36 are attached to the beam 34. For example, the members 36 and the beam 34 may be integral, that is, formed as a single piece without seams. Alternatively, the members 36 may be adhered to the beam 34 with adhesives, fastened with fasteners, etc.

The members 36 are positioned sequentially along the beam 34, in other words, are arranged in a single row in the direction of the longitudinal axis L. The outer tubes 40 of the members 36 are generally parallel to each other, that is, have member axes A that are parallel to each other. The outer tubes 40 may be oriented perpendicular to the beam 34, such as vertically. The members 36 are spaced from each other, that is, gaps are present between adjacent ones of the members 36. Adjacent ones of the members 36 are configured to contact each other when both adjacent ones of the members 36 are deformed. In other words, each member 36 is sufficiently close to immediately neighboring members 36 that the member 36 presses against one or both of the immediately neighboring members 36 when the member 36 deforms, as described in more detail below.

With continued reference to FIG. 4, the members 36 may be arranged in ascending order of the corresponding diameters of the outer tubes 40 from each end 60 to the midpoint 62 of the beam 34. In other words, the members 36 having relatively larger outer diameters are closer to the midpoint 62 of the beam 34 than the members 36 having relatively smaller outer diameters, and the members 36 having relatively smaller outer diameters are closer to the ends 60 of the beam 34 than the members 36 having relatively larger outer diameters. The members 36 may be arranged in ascending order of the corresponding wall thicknesses of the outer tubes 40 from the midpoint 62 to each end 60. In other words, the members 36 having relatively thicker-walled outer tubes 40 are closer to the ends 60 than the members 36 having relatively thinner-walled outer tubes 40, and the members 36 having relatively thinner-walled outer tubes 40 are closer to the midpoint 62 than the members 36 having relatively thicker-walled outer tubes 40.

The members 36 may be formed of any suitable material, including plastic, such as injection-molded plastic; metal, such as aluminum or steel; or any other suitable material.

The members 36 and the beam 34 may be formed separately or together. The members 36 and the beam 34 may be formed by any suitable method. For example, the members 36 and the beam 34 may be injection-molded, as one piece or separately. For another example, the beam 34 and the members 36 may be extruded. In order to be extruded, surfaces of the beam 34 and the members 36 may be straight, that is, lacking overhangs, undercuts, curves, etc. in one direction, e.g., vertically, e.g., in the direction of the member axes A. In other words, the beam 34 and the members 36 may have a cross-section that is constant in the one direction. That one direction may be the direction of extrusion.

Figure 6A:
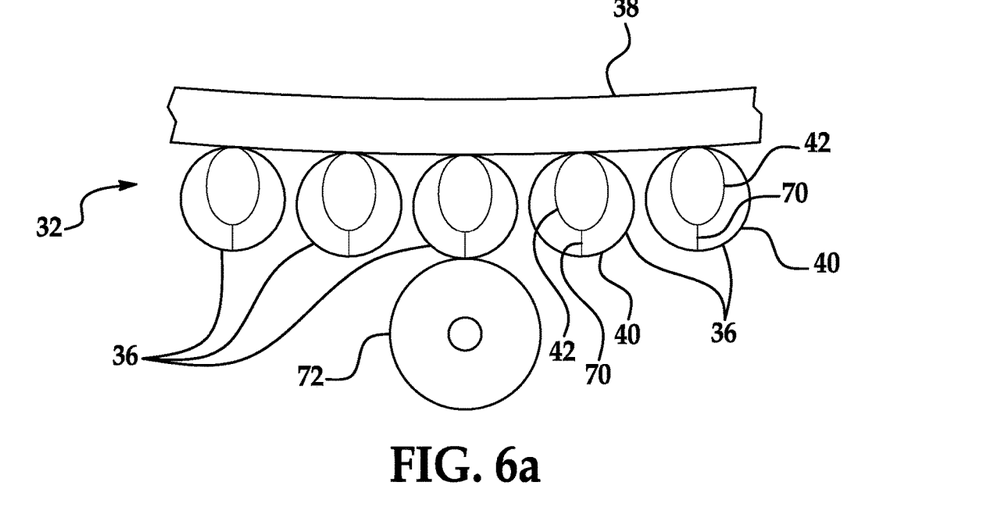
FIG. 6a is a top view of a portion of the bumper assembly before a first impact with a relatively narrow object.
Figure 6B:
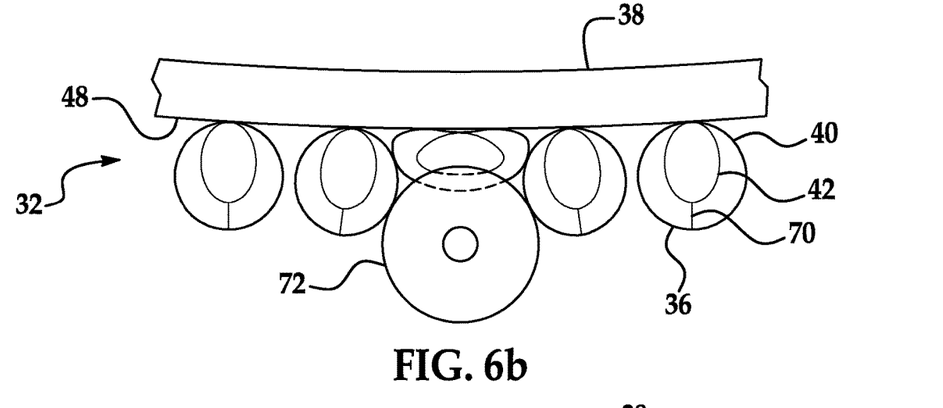
FIG. 6b is a top view of the portion of the bumper assembly during the first impact with the relatively narrow object.
Figure 6C:
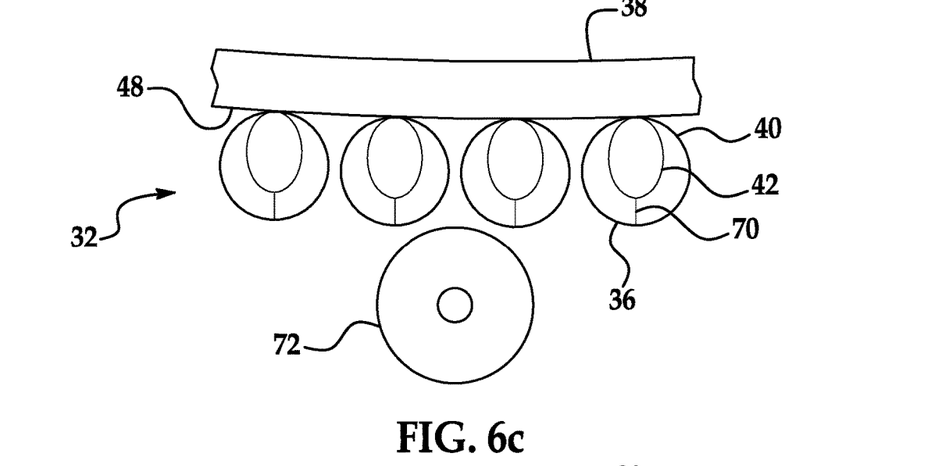
FIG. 6c is a top view of the portion of the bumper assembly before a second impact with the relatively narrow object.
Figure 6D:
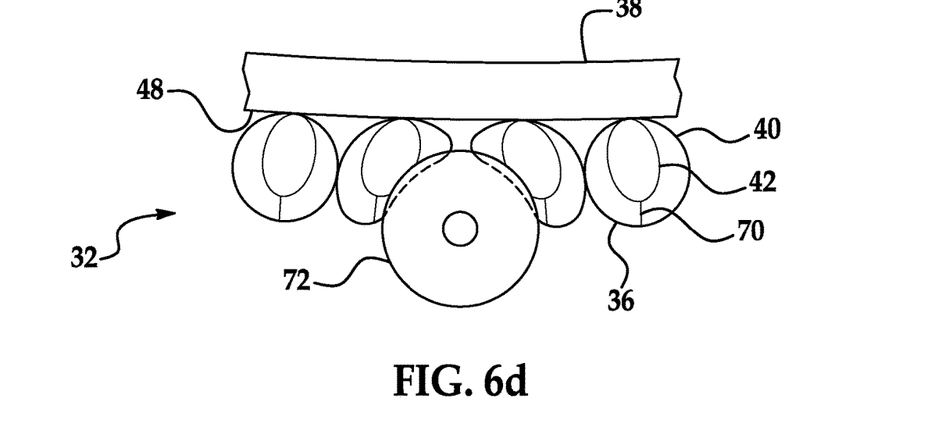
FIG. 6d is a top view of the portion of the bumper assembly during the second impact with the relatively narrow object.

With reference to FIGS. 6*a-d*, in the event that the bumper assembly 32 impacts a narrow impactor 72, for example, a leg of a pedestrian, first the fascia 54 will deform from impacting the impactor. Next, if the narrow impactor 72 is positioned relatively in line with one of the members 36 in the direction of impact, as shown in FIG. 6*a*, then the narrow impactor 72 will impact the member 36. The member 36 may deform and may contact one or both of the adjacent members 36, as shown in FIG. 6*b*. If the narrow impactor 72 is aligned relatively between two of the members 36 in the direction of impact, as shown in FIG. 6*c*, then the narrow impactor 72 will impact the two members 36. The two members 36 may deform and may each contact an adjacent member 36, as shown in FIG. 6*d*. In both cases, the bridge portions 70 of the impacted members 36 transfer some of the force of the impact from the outer tube 40 to the inner tube 42, so both the outer tubes 40 and the inner tubes 42 absorb some of the energy of the impact through deformation. In both cases, the resistance offered by the adjacent members 36 to the impacted members 36 is relatively low compared with an impact with a wide impactor 72, as described below.

Figure 7A:
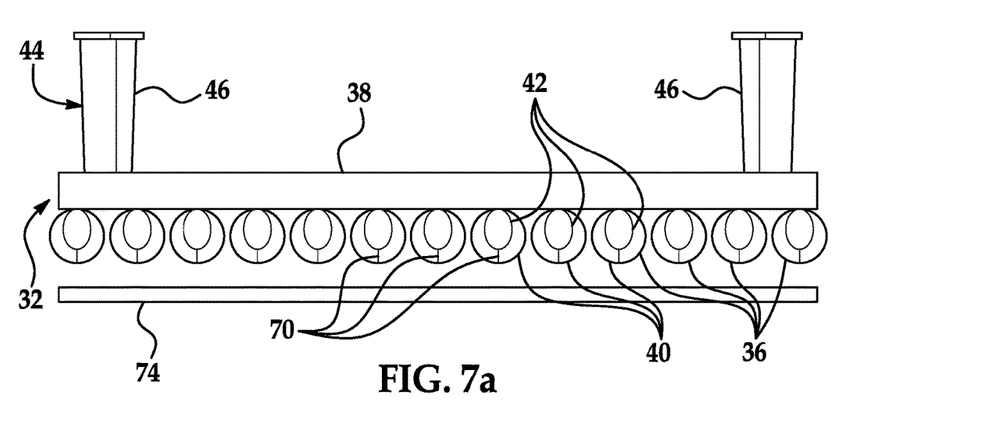
FIG. 7a is a top view of the bumper assembly before an impact with a relatively wide object.
Figure 7B:
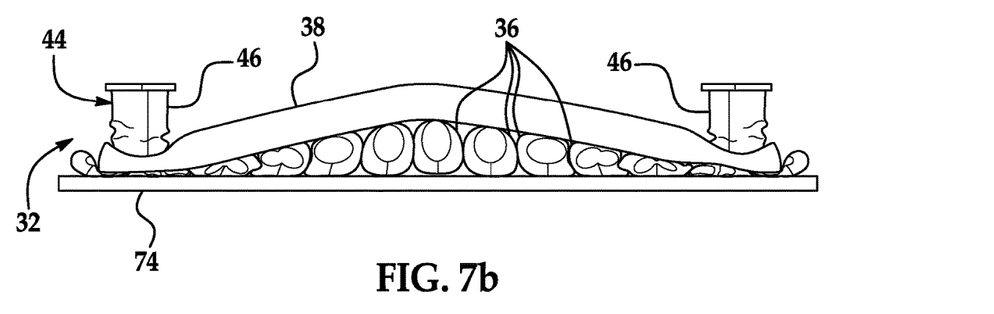
FIG. 7b is a top view of the bumper assembly at a first time during the impact with the relatively wide object.
Figure 7C:
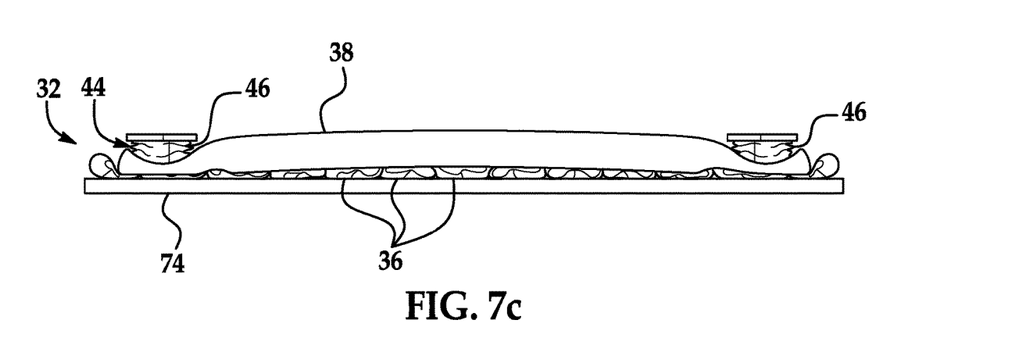
FIG. 7c is a top view of the bumper assembly at a second time during the impact with the relatively wide object.

With reference to FIG. 7*a-c*, in the event that the bumper assembly 32 impacts a wide impactor 72, for example, another vehicle, first the fascia 54 will deform from impacting the impactor. Then the wide impactor 72 impacts multiple members 36. The impacted members 36 deform in response to the impact. The deformation absorbs energy from the impact. As described above with respect to the narrow impact, both the outer tubes 40 and the inner tubes 42 absorb energy from the impact. If the impact has sufficient energy, then the members 36 contact adjacent members 36 while deforming. The adjacent members 36 reinforce each other. Reinforcement from adjacent members 36 makes the members 36 stiffer, and the members 36 thus provide greater resistance than in the case of the narrow impact. The bumper beam 38 may also deform and absorb energy, as shown in FIG. 7*b*. The crush cans 46 may also deform and absorb energy from the impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus comprising:
a beam; and
a plurality of members attached to and positioned sequentially along the beam; each member including an outer tube extending transverse to the beam and an inner tube extending parallel to and in the outer tube;
wherein adjacent ones of the members are configured to contact each other when both adjacent ones of the members are deformed;
each outer tube has an inner surface, and each inner tube is attached to the inner surface of the outer tube at a connection line;
each member includes a bridge portion extending from the inner surface of the outer tube to the inner tube; and
each bridge portion is attached to the inner tube opposite from the connection line.

2. The apparatus of claim 1, wherein the outer and inner tubes are round.

3. The apparatus of claim 1, wherein the inner tubes are elliptical.

4. The apparatus of claim 1, wherein the outer and inner tubes have wall thicknesses; and the wall thickness of each outer tube is thinner than the wall thickness of the corresponding inner tube.

5. The apparatus of claim 1, wherein the beam extends between two ends and has a midpoint halfway between the ends; the outer tubes have corresponding diameters; at least some of the diameters are different than other of the diameters; and the members are arranged in ascending order of the corresponding diameters of the outer tubes from each end to the midpoint.

6. The apparatus of claim 1, wherein the beam extends between two ends and has a midpoint halfway between the ends; the outer tubes have corresponding wall thicknesses; and the members are arranged in ascending order of the corresponding wall thicknesses of the outer tubes from the midpoint to each end.

7. The apparatus of claim 1, wherein the outer tubes are generally parallel to each other.

8. The apparatus of claim 7, wherein the members and the beam are integral.

9. The apparatus of claim 8, wherein the beam and members are extruded.

10. The apparatus of claim 1, wherein the members are spaced from each other.

11. The apparatus of claim 1, further comprising a bumper beam extending parallel to the beam; wherein the beam is coupled to the bumper beam.

12. The apparatus of claim 11, further comprising a fascia extending parallel to the beam; wherein the fascia is coupled to the bumper beam and extends around the members.

13. The apparatus of claim 11, wherein the beam has an upper edge and a lower edge extending in a direction of the beam, and the bumper beam includes a groove accepting the lower edge of the beam.

14. The apparatus of claim 13, wherein the bumper beam includes a second groove accepting the upper edge of the beam.

15. The apparatus of claim 13, wherein the beam is fastened at the upper edge to the bumper beam.

16. An apparatus comprising:
a beam; and
a plurality of members attached to and positioned sequentially along the beam; each member including an outer tube extending transverse to the beam and an inner tube extending parallel to and in the outer tube;
wherein adjacent ones of the members are configured to contact each other when both adjacent ones of the members are deformed
the beam extends between two ends and has a midpoint halfway between the ends;
the outer tubes have corresponding wall thicknesses; and
the members are arranged in ascending order of the corresponding wall thicknesses of the outer tubes from the midpoint to each end.

17. An apparatus comprising:
a beam;
a plurality of members attached to and positioned sequentially along the beam; each member including an outer tube extending transverse to the beam and an inner tube extending parallel to and in the outer tube; and
a bumper beam extending parallel to the beam;
wherein adjacent ones of the members are configured to contact each other when both adjacent ones of the members are deformed;
the beam is coupled to the bumper beam;
the beam has an upper edge and a lower edge extending in a direction of the beam; and
the bumper beam includes a groove accepting the lower edge of the beam.

18. The apparatus of claim 17, wherein the bumper beam includes a second groove accepting the upper edge of the beam.

19. The apparatus of claim 17, wherein the beam is fastened at the upper edge to the bumper beam.

* * * * *